United States Patent [19]

Hecht et al.

[11] Patent Number: 5,668,313

[45] Date of Patent: Sep. 16, 1997

[54] METHOD FOR CORRECTING THE OUTPUT SIGNAL OF AN AIR MASS METER

[75] Inventors: Hans Hecht, Korntal-Muenchingen; Dieter Tank, Eberdingen; Uwe Konzelmann, Asperg, all of Germany

[73] Assignee: Robert Bosch GmbH, Stuttgart, Germany

[21] Appl. No.: 553,469

[22] PCT Filed: Mar. 27, 1995

[86] PCT No.: PCT/DE95/00411

§ 371 Date: Nov. 10, 1995

§ 102(e) Date: Nov. 10, 1995

[87] PCT Pub. No.: WO95/26493

PCT Pub. Date: Oct. 5, 1995

[30] Foreign Application Priority Data

Mar. 28, 1994 [DE] Germany ............... 44 10 789.7

[51] Int. Cl.$^6$ ............... G01F 15/02; G01F 1/00; G01D 3/02; F02D 41/18
[52] U.S. Cl. ............... 73/118.2; 73/118.1
[58] Field of Search ............... 73/115, 116, 117.2, 73/117.3, 118.1, 118.2, 202.5, 204.11, 204.14, 204.17

[56] References Cited

U.S. PATENT DOCUMENTS

| | | | |
|---|---|---|---|
| 4,457,167 | 7/1984 | Sumal | 73/118.2 |
| 4,478,075 | 10/1984 | Oyama et al. | 73/118.2 |
| 4,527,530 | 7/1985 | Abe et al. | 73/118.2 |
| 4,555,937 | 12/1985 | Sumal | 73/118.2 |
| 4,571,990 | 2/1986 | Honig | 73/118.2 |
| 4,669,301 | 6/1987 | Kratt et al. | 73/118.2 |
| 4,694,806 | 9/1987 | Wataya et al. | 73/118.2 |
| 4,719,890 | 1/1988 | Wataya et al. | 73/118.2 |
| 4,774,833 | 10/1988 | Weibler et al. | 73/118.2 |
| 4,884,215 | 11/1989 | Zboralski et al. | 73/118.2 |
| 5,003,950 | 4/1991 | Kato et al. | 73/118.2 |
| 5,014,550 | 5/1991 | Gee et al. | 73/118.2 |
| 5,241,857 | 9/1993 | Schnaibel et al. | 73/118.2 |
| 5,355,726 | 10/1994 | Zurek et al. | 73/118.2 |
| 5,517,971 | 5/1996 | Nishimura et al. | 73/118.2 |

FOREIGN PATENT DOCUMENTS

| | | |
|---|---|---|
| 0219942 | 4/1987 | European Pat. Off. . |
| 0575635 | 12/1993 | European Pat. Off. . |
| 4324040 | 7/1993 | Germany . |
| 9402730 | 7/1993 | WIPO . |

*Primary Examiner*—George M. Dombroske
*Attorney, Agent, or Firm*—Michael J. Striker

[57] ABSTRACT

In a method for correcting an output signal of an air mass meter, an air mass aspirated by an internal combustion engine is detected, so that first a characteristic of the air mass meter representing a relationship between an output voltage of the air mass meter and a flow air mass is determined, the characteristic in a region which the air mass can flow back is corrected by changing the characteristic in a return flow region relative to the measured characteristic, the change of the characteristic is performed so that the relationship between the output voltage of the air mass meter and the measured air mass is adjusted to minimize error measurements, and the computations of the aspirated air mass is therefore performed with the aid of the corrected characteristic.

7 Claims, 3 Drawing Sheets

METHOD FOR CORRECTING THE OUTPUT SIGNAL OF AN AIR MASS METER

PRIOR ART

The invention relates to a method for correcting the pulsation error in the output signal of an air mass meter which enables the return flow to be detected, in accordance with the features of the preamble of claim 1.

Air mass meters which operate, for example, in accordance with the hot-film principle are used for detecting the air mass inducted by internal combustion engines. These usually have a heated element which is situated in the airflow to be measured and is cooled thereby. Since during operation of the internal combustion engine it is possible for conditions to arise under which pulsations can occur in the induction air, some air mass meters have temperature sensors with the aid of which the temperature difference upstream and downstream of a heating region can be determined so that it is possible to detect the direction of flow. It is also possible in the case of such air mass meters to define a characteristic having a range for returning air. In this case, characteristic is taken to mean the relationship between the output voltage of the air mass meter and of the air mass. Such an air mass meter is disclosed, for example, in DE-OS 43 24 040.

Despite the detection of the return flow, in the case of such an air mass meter the indication of the return flow is not completely correct when there is a pulsating air flow with a return flow. Normally, too low an air mass is indicated by the sensor or air mass meter. The reason for this resides in the thermal inertia of the measuring principle, which although relatively slight is present.

ADVANTAGES OF THE INVENTION

The method according to the invention and having the features of the main claim has, by contrast, the advantage that even in the case of the occurrence of return flows a very high accuracy of the air mass detection, and thus of the detection of the load value of the internal combustion engine is possible. This is rendered possible by virtue of the fact that the characteristic range of the air mass meter, which characterizes the pulsating operation of the internal combustion engine, is changed such that the average air mass indicated by the air mass meter corresponds in the case of pulsation with return flow to the actual air mass inducted by the engine.

Since the characteristic range of the return flow is reached exclusively in the case of pulsating operation of the internal combustion engine, a correction is advantageously carried out only when a return flow is detected. In the case of non-pulsating operation, the usual characteristic is employed, and no correction is then required.

Further advantages of the invention are achieved by means of the measures specified in the subclaims.

DRAWING

The invention is represented and explained in more detail below with the aid of the drawing in which, in particular, FIG. 1a shows an air mass meter such as is disclosed, for example, in DE-OS 43 24 040, FIG. 1b shows a possible evaluation circuit, FIG. 2 shows the characteristic of such an air mass meter, including the influences, according to the invention, on the characteristic, and FIG. 3 shows a time characteristic of the pulsating air mass.

DESCRIPTION OF THE EXEMPLARY EMBODIMENT

Figure 1A:
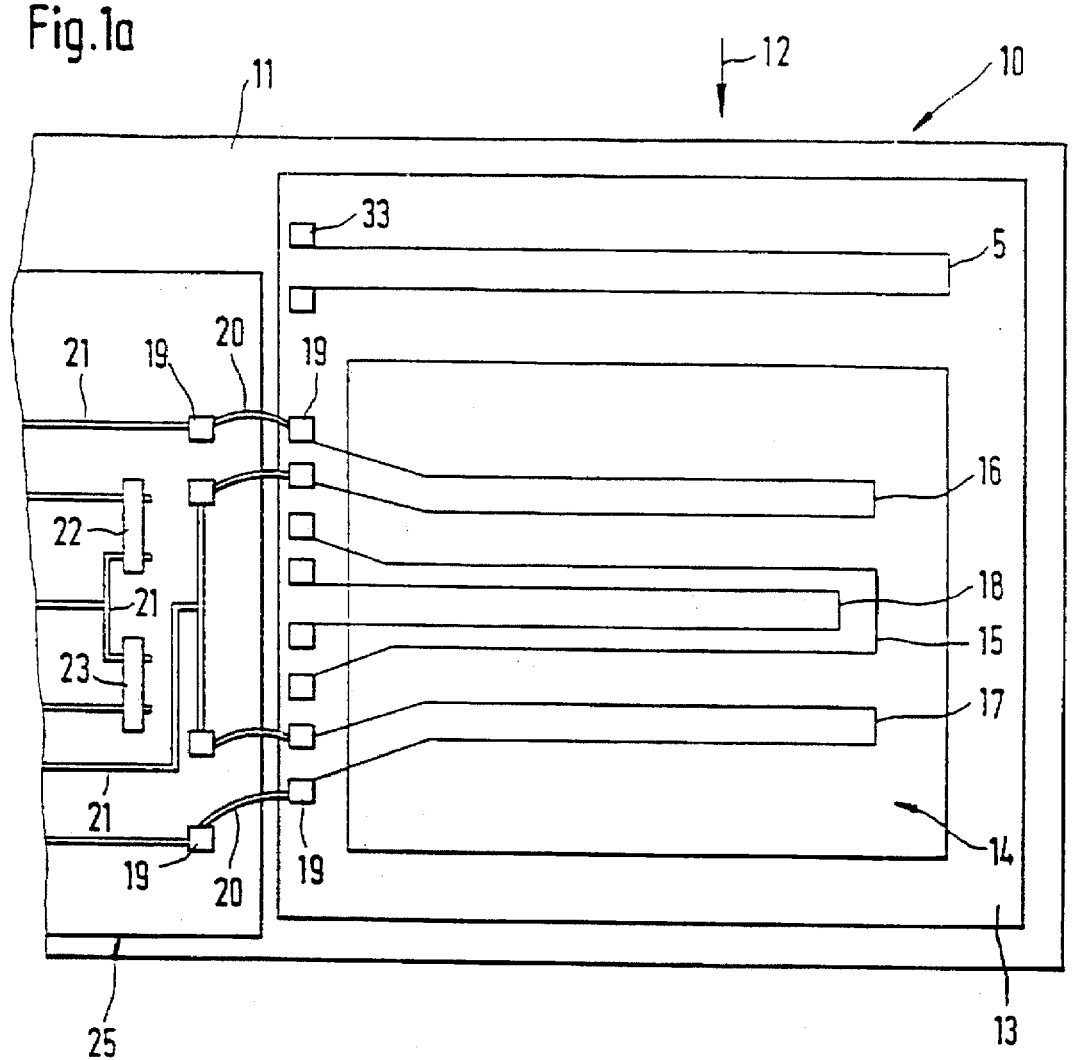

In the known air mass meter represented in FIG. 1a, the sensor element 10 is arranged on a carrier 11. Said element is located in the flow of medium indicated by the arrow 12, that is to say, for example, of the flowing air in the induction pipe of an internal combustion engine.

The sensor element 10 in this case has a frame 13, made from monocrystalline silicon, as well as a dielectric diaphragm 14 on which a heater 15 and two temperature detectors 16, 17 and a heater temperature sensor 18 are arranged. The elements arranged on the sensor element 10 are connected via bonding pads 19 and bonding wires 20 to thick-film circuits which are located on the carrier 11 and consist of thick-film conductor tracks 21 as well as thick-film resistors 22, 23. The precise embodiments and the possibilities for variation are to be gathered from DE-OS 43 24 040 in this case.

The two temperature detectors 16, 17 are brought by the heater 15 to a temperature which is above the temperature of the undisturbed flowing medium. There takes place between the medium and the diaphragm 14 a heat exchange which is a function of the temperature difference between the respective position of the diaphragm and the medium. Since the temperature detector 17 is situated downstream of the heater 15 in the direction of flow, the heat transfer from the temperature detector 17 to the flowing medium is less, since the medium is already at a higher temperature because of the heater 15. The temperature difference thus produced between the temperature detector 16 and the temperature detector 17 is a measure of the mass flow of the medium flowing past.

The two temperature detectors 16, 17 and the thick-film resistors 22, 23 are connected in a bridge circuit which is situated between a supply voltage UV and earth. The center tab of the two bridge arms is connected in the usual way to a differential amplifier 24 having a feedback resistor 26. The latter outputs a signal UA which is proportional to the voltage difference across the bridge diagonal and is to be evaluated in accordance with the method according to the invention.

The thick-film resistors 22, 23, the amplifier 24 and, if necessary, further components can be arranged on a dedicated carrier 25 which is applied to the carrier 11.

Figure 1B:
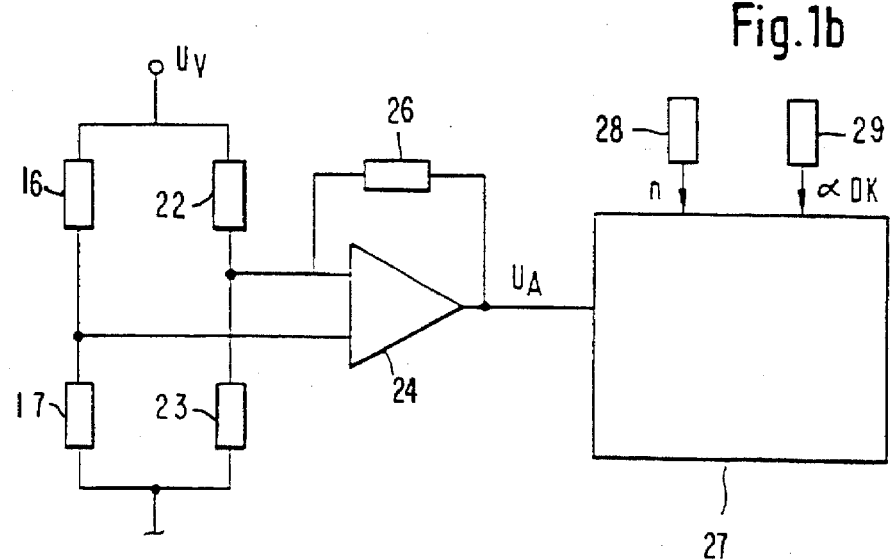
Figure 2:
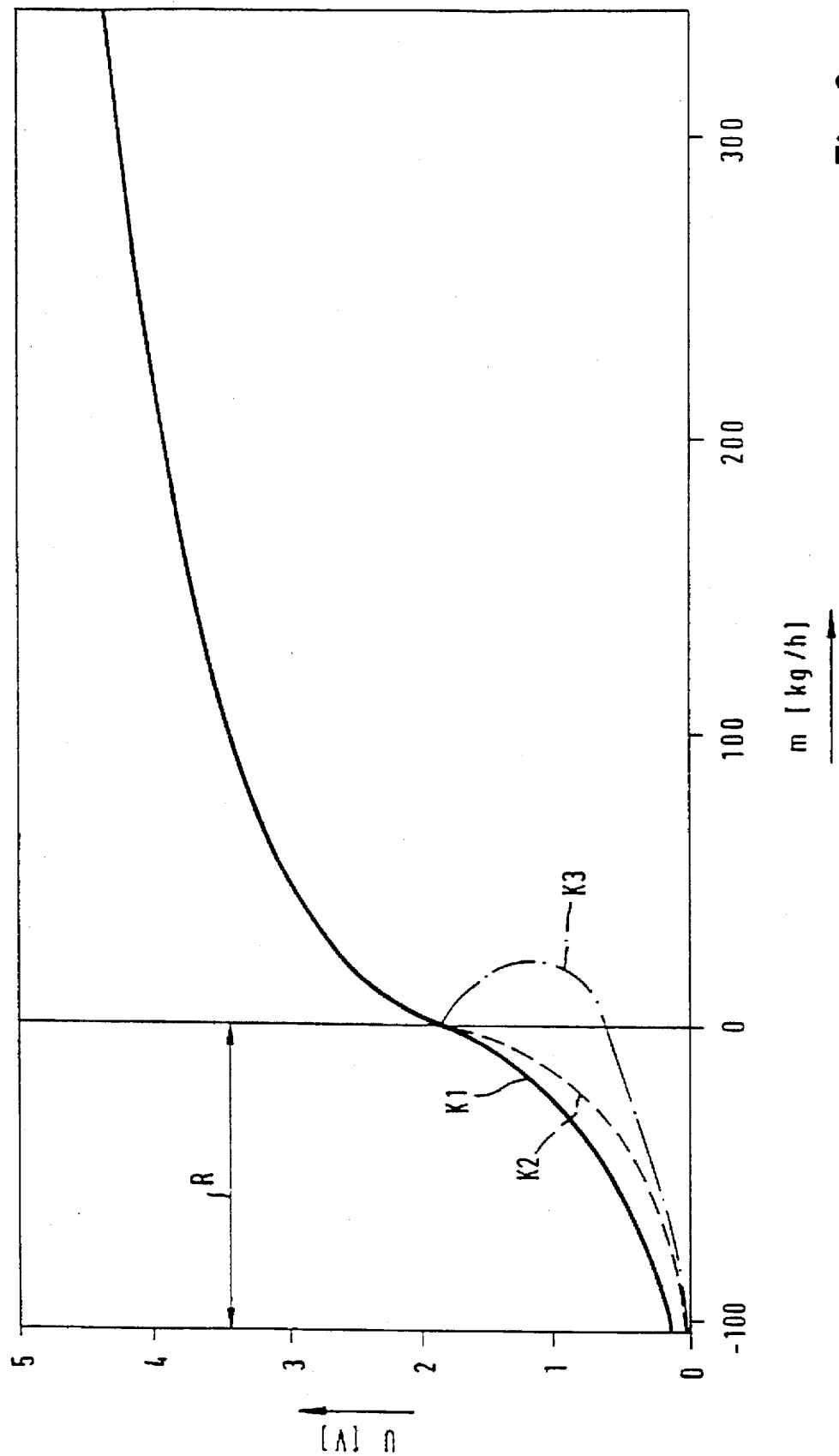

By evaluating a temperature difference upstream and downstream of the heating region 18, the direction of flow can be detected with the aid of the air mass meter represented in FIG. 1, whose amplified output signal UA is further processed, for example, by the control device 27 or another evaluation unit. It is thus also possible to define a characteristic having a range for returning air. Such a characteristic is represented in FIG. 2, the voltage U being plotted in volts on the ordinate and the air mass m being plotted in kg/h on the abscissa. The zero line separates the return flow region R from the remaining region. The continuous characteristic K1 represents a measured characteristic which is effected by errors in the return flow region and is to be suitably corrected.

As has been shown by comparative measurements using the test stand, in which the air actually consumed was determined, despite the detection of return flow the indication of the sensor described in FIG. 1 is not exact in the case of pulsating air flow with return flow. The sensor indicates too low an air mass. The reason for this resides in the thermal inertia of the measuring principle, which although slight is nevertheless present.

It is known that the characteristic range of the return flow is reached exclusively in the case of pulsating operation of the internal combustion engine. The modification of the characteristic in the return range thus normally does not relate to the operation of the air mass meter for non-pulsating operation. If the characteristic in the return flow region R is changed such that the average air mass indicated by the sensor corresponds in the case of pulsations with return flow to the air mass actually inducted by the engine, the characteristic profile K2 drawn in by dashes is obtained. An extreme modification of the characteristic is possible by making use of the characteristic profile K3, likewise represented by dashes, which even reaches into the normal range.

Figure 3:
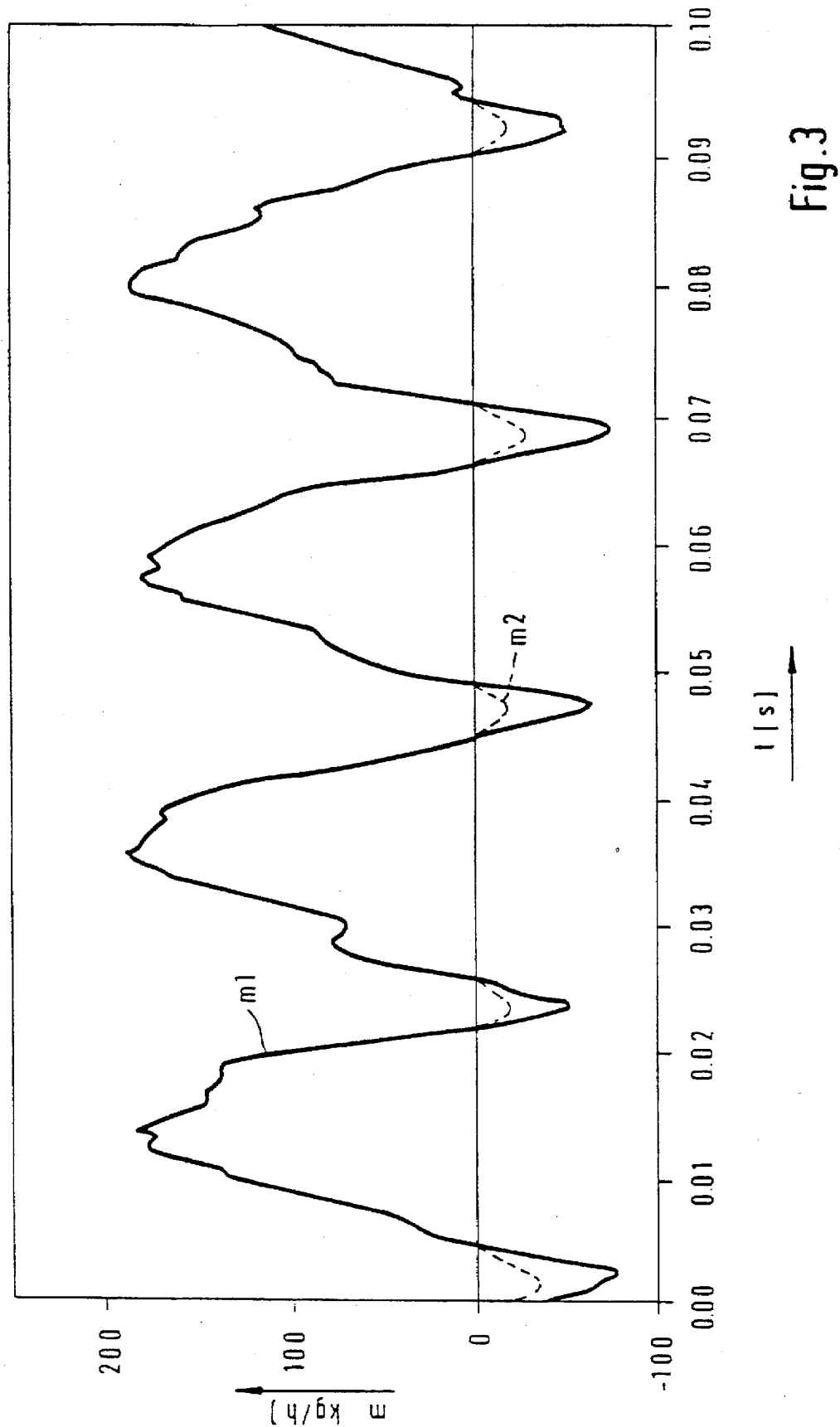

FIG. 3 shows how by means of a different assignment of air mass to the signal voltage the air mass meter signal is changed in the return flow region and how thereby the average indicated air mass per induction stroke is increased. The reduced indication caused by thermal inertia can be compensated thereby. The return flow characteristic can be changed at will in this case, all that is required is a unique relationship between voltage and air mass value.

The air mass m is plotted in FIG. 3 in kg/h against time t in seconds. In this case, the continuous curve m1 shows the time profile of the air mass with a measured characteristic. Profile m2 with a modified characteristic in the return flow region is represented by dashes.

The pulsation correction by a modified return flow characteristic generates a slight indication error of the air mass meter only in a narrow frequency-air mass range. Strong pulsations with return flow normally occur with a specific the of internal combustion engine only in the case of a specific speed and of large opening angles of the throttle valve, that is to say the pulsation frequency remains constant and the average air mass changes only little.

The return flow characteristic to be modified need therefore be adapated only for one frequency and one air mass. This adaptation has to be carried out individually for different internal combustion engines, and can be performed, for example, empirically by comparison with data obtained from the test stand. In the case of internal combustion engines having large pulsation errors, a marked reduction in the error is achieved by means of the method according to the invention.

The average value of the air mass or the air mass per stroke, etc., is determined in the usual way from the air mass profile m(t) obtained using a modified characteristic. The control and/or regulation of the internal combustion engine is performed proceeding from the values thus determined. Account is also taken for this purpose of further parameters such as the speed n of the internal combustion engine and/or the throttle valve angle $\alpha_{DK}$, which are measured via appropriate sensors 28, 29.

We claim:

1. A method for correcting an output signal of an air mass meter for detecting an air mass aspirated by an internal combustion engine, comprising the steps of determining a characteristic of the air mass meter which represents a relationship between an output voltage of the air mass meter and a flowing air mass; correcting the determined characteristic in a return flow region in which the flowing air mass flows back in predetermined operational conditions of the internal combustion engine; performing the correcting so that error measurements occurring in the return flow region are minimized and the corrected characteristic is stored in a memory of a computing device; and calculating an actual determined flowing air mass by the computing device with consideration of the stored corrected characteristic.

2. A method as defined in claim 1, and further comprising using a control device of the internal combustion engine as the computing device, so that the corrected characteristic is stored in the control device of the internal combustion engine, and the actual determined flowing air mass is calculated by the control device of the internal combustion engine.

3. A method as defined in claim 2, wherein the control device determines an average value of the measured air mass.

4. A method as defined in claim 1, wherein the characteristic and correction values are determined for a specific type of the internal combustion engine and stored in a control device of the internal combustion engine of the specific type.

5. A method as defined in claim 1, and further comprising using the determined characteristic of the air mass meter in the return region which is modified, for a pulsation correction only in a narrow frequency range of pulsations.

6. A method as defined in claim 5, wherein the pulsation correction is undertaken only in a prescribable speed of a throttle valve.

7. A method as defined in claim 5, wherein the pulsation correction is undertaken only in a prescribable angle range of a throttle valve.

* * * * *